Sept. 25, 1928.

H. MAXWELL

INDUCTION MOTOR

Filed June 17, 1924

1,685,677

Inventor
Howard Maxwell
by
His Attorney

Patented Sept. 25, 1928.

1,685,677

UNITED STATES PATENT OFFICE.

HOWARD MAXWELL, OF SCHENECTADY, NEW YORK, ASSIGNOR TO GENERAL ELECTRIC COMPANY, A CORPORATION OF NEW YORK.

INDUCTION MOTOR.

Application filed June 17, 1924. Serial No. 720,688.

My invention relates to induction motors and particularly to those of the squirrel cage type. The object of my invention is to provide in a motor of the above type, a rotor having a high resistance winding, and consequently a good starting torque, which will effectively radiate its generated heat without materially heating the other windings of the motor.

One of the principal limiting features in the capacity and size of electric motors is the heating which occurs due to the heat generated within the windings when starting and running under load. This is particularly true in the case of induction motors since it is necessary to have a relatively high resistance winding on the rotor in order to produce a good starting torque. Such a winding, however, produces considerable heating and consequently the motor has to be made large enough to successfully radiate this generated heat.

In certain classes of work such as the driving of sugar centrifugals, hydro-extractors, and the like, where the service demands a high accelerating torque and a low running torque on a cycle of duty often repeated, an induction motor having a relatively high permanent resistance rotor can be successfully used providing provisions are made for the radiation of the heat generated in the high resistance rotor winding.

Induction motors of both the squirrel cage and the wound rotor type have heretofore been used in the above type of service. The wound rotor type of motor while being more difficult and expensive to build has the advantage that the principal loss in the machine, which occurs in the rotor circuit, can be separated from the motor itself and localized in the starting resistances, and thus the motor may be relatively small in size and still operate within the usual temperature limits. On the other hand, a squirrel cage motor has the advantage of being cheaper and simpler in construction, but as heretofore built, the heating due to losses in the rotor windings so affect the heating of the stator winding that such a motor must be built larger than one of the wound rotor type and therefore no material saving in cost is obtained.

In accordance with my invention, I provide an induction motor which is applicable to the above and similar classes of service and which can be made smaller than heretofore possible by arranging the high resistance rotor winding in such a manner that the losses in this winding cannot materially affect the heating of the other windings of the motor.

Figure 1:
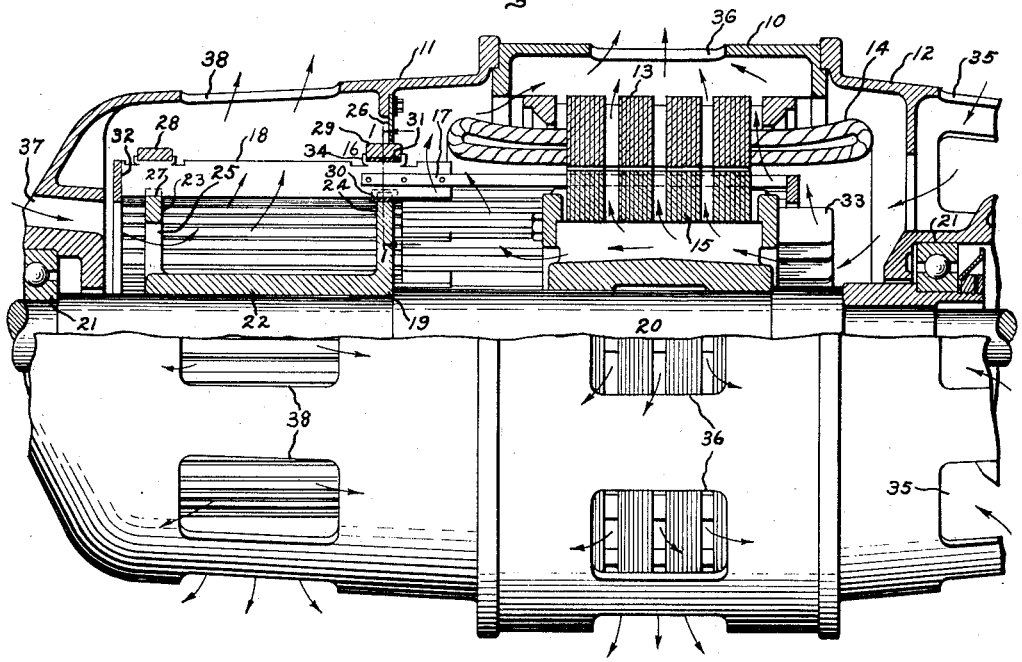
Figure 2:
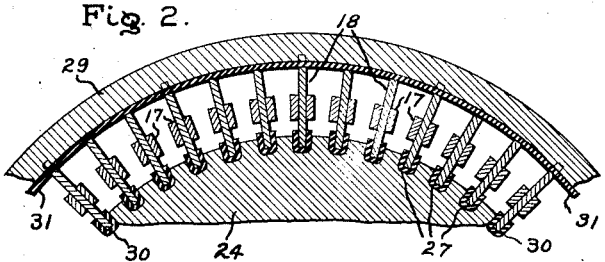
Figure 3:
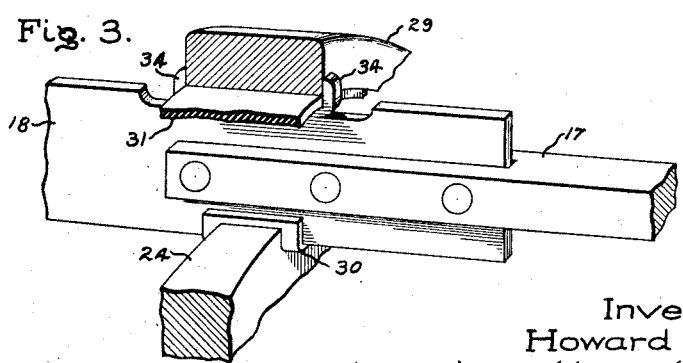

Various other features of novelty which characterize my invention are pointed out with particularity in the claims annexed to and forming a part of this specification. For a better understanding of my invention, reference may be had to the following description, taken in connection with the accompanying drawing in which Fig. 1 is a side elevation, partly in section of an induction motor embodying my invention; Fig. 2 is a section taken along line 1—1 of Fig. 1 and Fig. 3 is a fragmentary perspective view showing the preferred method of supporting the rotor conductors.

In the drawing an induction motor of the squirrel cage type is shown having a frame composed of a member 10 and end shields 11 and 12. The member 10 and end shields 11 and 12 are provided with ventilating passageways which permit a free circulation of cooling air therethrough. Supported in the member 10 is a laminated stator structure 13 which carries a stator winding 14 of the usual type and rotatably mounted within the stator structure 13 is a rotor structure 15. The rotor structure 15 is provided with a squirrel cage winding 16 which is composed of two members or portions, 17 and 18, of different relative resistance, the latter of which has the greater resistance and extends out in an axial direction away from the rotor structure 15, that is, it is arranged endwise and in the same plane as the portion 17 located in the slots. This extending portion 18 of winding 16 is carried by a support 19 and is adapted to radiate and circulate the heat generated therein away from the remaining windings of the motor.

The rotor structure 15 is mounted upon a shaft 20 which is journalled in bearings 21 carried by the end shields 11 and 12. The shaft 20 also carries the support 19. This support 19 is shown in the drawing as spool shaped, having a body portion 22, and end flanges 23 and 24. The flange 23 is provided with openings 25 through which air can circulate and flange 24 is made solid to prevent any circulation of air therethrough. This latter flange cooperates with the end shield 11, or as shown in the drawing with an annular member 26 secured to the end shield 11, to form a partition between the stator structure 13, winding 14 and the high resistance portion 18 of the rotor winding 16. This partition prevents the intermingling of the heat radiated by the high resistance portion 18, with the cooling air circulating about the stator winding 14. As a result of the partition formed by the flange 24 and the annular member 26, the motor frame is divided into two compartments. One of these compartments contains the stator structure 13, stator winding 14 and the low resistance portion 17 of the rotor winding 16 and the other compartment contains the high resistance portion 18 of the rotor winding 16. Each of these compartments is provided with openings through which cooling air can circulate as will be hereinafter pointed out.

The outer periphery of the flanges 23 and 24 are provided with notches 27 into which the conductors of the high resistance portion 18 of winding 16 are seated. After the high resistance portion 18 is seated in notches 27, rings 28 and 29 are slipped over this portion of the winding and serve to hold it in place. The notches 27 in the flange 24 are provided with insulating strips 30 which prevent the winding 16 being short circuited where thus supported. The ring 29 is also insulated from the winding 16 by a strip of insulation 31.

In the drawing the high resistance portion 18 of winding 16 is shown as composed of separate pieces of conductor which are secured to the low resistance portion 17 by rivets. It should be understood however, that the winding 16 can be made in any well known way and if desired can be made of continuous conductor bars, the high resistance portion being produced by reducing the cross section of the conductors at the projecting end. This portion of the winding is provided with a high resistance end ring 32 which short circuits the projecting or outer ends of the high resistance portion 18 of the winding 16. The high resistance portion 18 of the winding 16 is preferably composed of thin narrow strips which are arranged edgewise upon the support 19 as shown in Fig. 2. This arrangement produces a very effective fan for circulating cooling air between the individual conductors. In arranging the thin strips of the high resistance portion 18 on the support 19, every third strip is allowed to project through the flange 24 toward the stator windings 14. These projecting ends, together with fan blades 33 which are mounted on the opposite end of the rotor structure 15, provide a means for circulating cooling air about the low resistance portion 17 of winding 16 and the stator winding 14.

When the motor is operating air will be circulated through the motor in two paths, one on each side of the partition formed by flange 24 and the annular member 26. On one side of the partition, air will be drawn in through the openings 35 in the end shield 12 and circulated through one of the compartments by the fans 33 and the projecting ends of the high resistance portion 18, the air passing through the air ducts in the rotor structure 15, the stator structure 13, also around the end turns of the stator windings 14 and out through openings 36 in the member 10. On the other side of the partition, air will be drawn in through openings 37 in the outer end of the end shield 11 and forced outwardly between the high resistance portion 18 and out through openings 38 located around the cylindrical part of the end shield 11.

After the rings 28 and 29 have been slipped into place over the high resistance portion 18 of winding 16, small tongues 34 are cut away from the top edge of every third conductor, as shown in Fig. 3 and are then turned upwardly so as to provide against the rings 28 and 29 moving endwise along the high resistance portion of the winding 16.

From the above description it will be seen that I have produced an induction motor having a high resistance rotor in which means are provided for causing independent circulations of cooling air through the windings and have also provided an effective arrangement whereby the heat radiated by the high resistance portion of the rotor windings is prevented from coming in contact with the stator windings.

What I claim as new and desire to secure by Letters Patent of the United States, is—

1. In an induction motor, the combination of a frame, a stator structure mounted within said frame, a shaft rotatably mounted and projecting through said stator structure, a rotor structure secured to said shaft and having conductor slots adjacent said stator structure, a fixed support secured to said shaft and axially displaced from said rotor structure, and a winding for said rotor structure having one portion located within the slots of said rotor structure and another portion connected thereto and arranged endwise and in the same plane as the portion located in said slots, said latter portion of said winding being of relatively high resistance and located on said support and adapted to produce a circulation of air for cooling said portion of said winding.

2. In an induction motor, the combination of a frame having a ventilated compartment, a stator structure and stator winding located within said compartment, a rotor structure also located within said compartment, a rotor winding mounted on said rotor structure having a high resistance portion adapted to radiate the greater portion of the heat generated within said winding outside of said compartment, and a plurality of supports located at the ends of the high resistance portion of said rotor winding one of which is adapted to partially close one end of said compartment, said supports cooperating with said winding to form a fan for circulating cooling air through the winding projecting outside of said compartment.

3. In an induction motor, the combination of a frame having a plurality of compartments, a stator winding within one of said compartments, a rotor structure also in said compartment, a rotor winding mounted on said rotor structure and extending through each of said compartments, and a support in another of said compartments adapted to support the extending end of said rotor winding and co-operate therewith to form a fan for circulating cooling air through both of said compartments.

4. In an induction motor, of the squirrel cage type, the combination of a frame having a plurality of compartments, a stator winding within one of said compartments, a rotor structure, a high resistance squirrel cage winding for said rotor structure comprising a relatively low resistance portion located in the magnetic portion of said rotor structure, and a relatively high resistance portion secured to the end of said low resistance portion and forming a continuation thereof in the same plane as the low resistance portion, and a spool like support for said relatively high resistance portion axially displaced from said magnetic portion of said rotor structure and insulated from said winding where the two portions are secured together, the inner flange of said support forming a partition between the low resistance and high resistance portions of said winding and said high resistance portion being arranged on said support to produce a circulation of cooling air through said winding on each side of said partition.

5. In an induction motor, the combination of a frame, a stator structure and a stator winding mounted in said frame, a rotor structure rotatably mounted within said stator structure, a winding upon said rotor structure having a high resistance portion composed of thin strips arranged endwise in the same plane as the low resistance portion extending away from said stator structure and forming a fan for circulating cooling air, and an end shield secured to said frame and enclosing the extending portion of said rotor winding having openings in its outer end and its sides through which air is circulated by said extending portion of the rotor winding.

6. In an induction motor, the combination of a frame having two compartments with ventilating openings, a stator structure and stator winding located within one of said compartments, a rotor structure also located within one of said compartments, and a rotor winding mounted on said rotor structure extending into the other of said compartments and co-operating with the ventilating openings in said compartments to cause an independent circulation of cooling air through each of said compartments.

7. In an induction motor, a stator structure, a shaft, a rotor structure secured to said shaft and having conductor slots adjacent said stator structure, and a winding for said rotor structure comprising conductors having low resistance portions located in the slots thereof and high resistance portions forming a continuation of said low resistance portions and extending in an axial direction away from the rotor structure, and an end ring for short circuiting the outer ends of said high resistance portions of said conductors.

8. In an induction motor, a stator structure, a shaft, a rotor structure secured to said shaft and having conductor slots adjacent said stator structure, and a winding for said rotor structure comprising conductors having low resistance portions located in the slots thereof and high resistance portions forming a continuation of said low resistance portions and extending in an axial direction away from the rotor structure, said high resistance portions of said conductors being adapted to produce a circulation of air for cooling the same, and an end ring for short-circuiting the outer ends of said high resistance portions of said conductors.

In witness whereof, I have hereunto set my hand this 16th day of June, 1924.

HOWARD MAXWELL.